(12) United States Patent
Singleton

(10) Patent No.: US 9,640,217 B1
(45) Date of Patent: May 2, 2017

(54) SYSTEMS AND METHODS FOR FLAW SCAN WITH INTERLEAVED SECTORS

(71) Applicant: Avago Technologies General IP (Singapore) Pte. Ltd., Singapore (SG)

(72) Inventor: Jefferson Singleton, Longmont, CO (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 14/954,343

(22) Filed: Nov. 30, 2015

(51) Int. Cl.
G11B 5/09 (2006.01)
G11B 20/10 (2006.01)
G11B 5/02 (2006.01)
G11B 20/12 (2006.01)

(52) U.S. Cl.
CPC .............. G11B 20/10 (2013.01); G11B 5/02 (2013.01); G11B 2020/1238 (2013.01)

(58) Field of Classification Search
CPC .. G11B 5/00; G11B 5/02; G11B 27/36; G11B 5/012; G11B 20/1426; G11B 5/09; G11B 27/3027; G11B 2220/90; G11B 20/18
USPC .............. 360/24, 25, 31, 40, 48, 53, 39
See application file for complete search history.

(56) References Cited

U.S. PATENT DOCUMENTS

| | | | |
|---|---|---|---|
| 9,001,445 B1 * | 4/2015 | Cao | G11B 5/59655 360/39 |
| 2014/0129890 A1 | 5/2014 | Singleton et al. | |
| 2014/0351604 A1 | 11/2014 | Kayama | |

* cited by examiner

*Primary Examiner* — Nabil Hindi
(74) *Attorney, Agent, or Firm* — Sheridan Ross P.C.

(57) ABSTRACT

Systems and methods relating generally to determining flaws on a storage medium.

20 Claims, 6 Drawing Sheets

US 9,640,217 B1

SYSTEMS AND METHODS FOR FLAW SCAN WITH INTERLEAVED SECTORS

FIELD OF THE INVENTION

Systems and methods relating generally to determining flaws on a storage medium.

BACKGROUND

Storage media are often checked during the manufacturing stage by writing a pattern to a storage medium and reading it back. The read back data is compared with that written to determined whether any areas of the medium are defective. This process takes considerable time as some patterns that make flaws easy to discern are incompatible with requirements for a shipped storage medium, thus requiring a second compatible pattern to be written before the storage medium is deployed in the field. This is wasteful in both time and expense.

Hence, for at least the aforementioned reasons, there exists a need in the art for advanced systems and methods for determining flaws in a storage medium.

SUMMARY

Systems and methods relating generally to determining flaws on a storage medium.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present inventions, and may be included in more than one embodiment of the present invention. Importantly, such phrases do not necessarily refer to the same embodiment. Many other embodiments of the inventions will become more fully apparent from the following detailed description, the appended claims and the accompanying drawings.

BRIEF DESCRIPTION OF THE FIGURES

A further understanding of the various embodiments of the present inventions may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Systems and methods relating generally to determining flaws on a storage medium.

Figure 1:
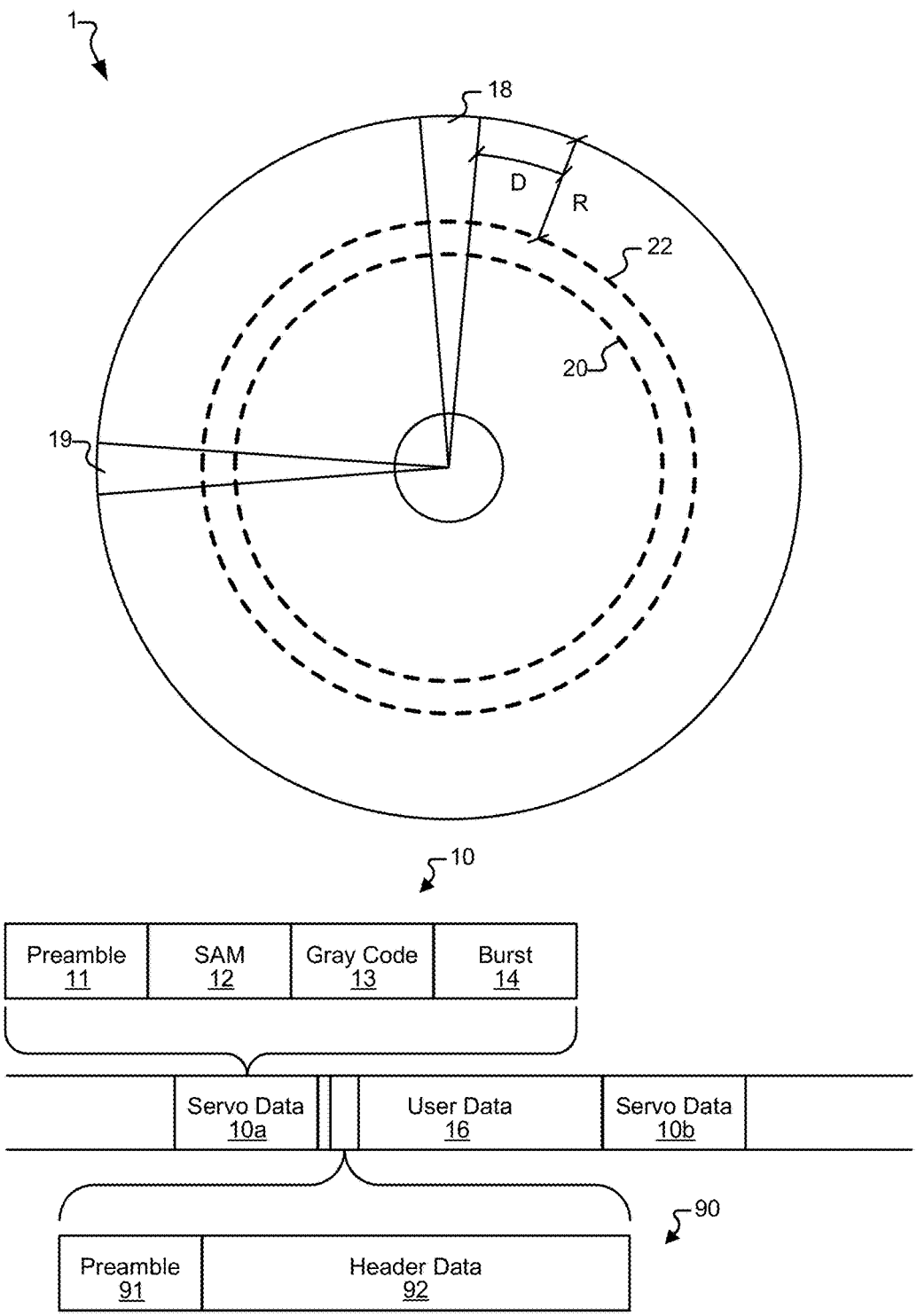
FIG. 1 is a block diagram of a known magnetic storage medium and sector data scheme.

Turning to FIG. 1, a storage medium 1 is shown with two exemplary tracks 20, 22 indicated as dashed lines. The tracks are divided into sectors by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 may include wedge identification information followed by the SAM. Sector address mark 12 is followed by a Gray code 13, and Gray code 13 is followed by burst information 14. Gray code 13 may include track identification information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 includes some synchronization and header data 90 that includes a preamble pattern 91 and a head data 92 followed by user data within user data region 16. Based upon the disclosure provided herein, one of ordinary skill in the art will recognize a variety of data that may be included in header data 92.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. When reading data in user data region 16, synchronization to the data is done through use of preamble 91. In a write operation, the sensor would sense servo data from wedge 19 then write data to the user data region between wedge 19 and wedge 18. Then, the sensor would be switched to sense a remaining portion of the user data region followed by the servo data from wedge 18. Of note, wedges 18, 19 follow arcs corresponding to the geometry of an arm and pivot as is known in the art.

Some embodiments of the present inventions provide non-transitory storage media maintaining information readable by an electronic data processing circuit. The non-transitory storage media include: a first track including a first servo wedge, a second servo wedge, and a first user data region disposed between the first wedge and the second wedge; and a second track adjacent to the first track, where the second track includes the first servo wedge, the second servo wedge, and a second user data region disposed between the first wedge and the second wedge. The first user data region includes at least a first preamble pattern, a first group of data modified by a first pattern, and a second group of data modified by a second pattern. The second user data region includes at least a second preamble pattern, a third group of data modified by the second pattern, and a fourth group of data modified by a third pattern. The third group of data on the second track is not adjacent to the second group of data on the first track.

In some instances of the aforementioned embodiments, the first group of data, the second group of data, the third group of data, and the fourth group of data are flawscan data. In various instances of the aforementioned embodiments, the first pattern is orthogonal to both the second pattern and the third pattern. In some instances of the aforementioned embodiments, the first pattern is a 2T pattern, the second pattern is a 3T pattern, and the third pattern is a 4T pattern. In some instances of the aforementioned embodiments, the non-transitory medium is a magnetic storage medium, and the information is maintained as a magnetic pattern.

In particular instances of the aforementioned embodiments, the non-transitory storage medium is incorporated into a hard disk drive system that includes: a read/write head assembly disposed near the storage medium and operable to sense the information and to convert the information to an analog signal; and a read channel circuit operable to process a data input derived from the analog signal. The read channel circuit includes a circuit to reverse: the modification of the first group of data by the first pattern; the modification of the second group of data by the second pattern; the modification of the third group of data by the second pattern; and the modification of the fourth group of data by the third pattern.

Other embodiments of the present invention provide methods for data processing that include: providing a storage medium including at least a first track and a second track, where the first track is next to the second track; XORing a received data set by a selected pattern to yield a modified data set; using a data encoding circuit to encode the modified data set to yield a generated codeword; storing the generated codeword as part of a write data set to a storage medium; and selecting one of a first pattern, a second pattern, or a third pattern as the selected pattern such that a first codeword on the first track of a storage medium adjacent to a second codeword on the second track of the storage medium does not represent a data set modified by the same selected pattern as a data set represented by the second codeword. In some cases, data encoding circuit is a low density parity check encoding circuit.

Yet other embodiments of the present inventions provide data processing systems that include: an XORing circuit operable to XOR a received data set by a selected pattern to yield a modified data set; a data encoding circuit operable to encode the modified data set to yield a generated codeword; an interleaver circuit operable to interleave a group of data including the generated codeword and other data modified using the selected pattern to yield a first interleaved output; a data write circuit operable to write the interleaved output to a storage medium, where the storage medium includes at least a first track adjacent to a second track; and a pattern selection circuit operable to select one of a first pattern, a second pattern, or a third pattern as the selected pattern such that the first interleaved output is stored on the first track adjacent to a second interleaved output stored on the second track, where the second interleaved output includes data modified by a pattern other than the selected pattern. In some cases, the data processing systems are implemented as part of an integrated circuit. In various cases, the data encoding circuit is a low density parity check encoding circuit.

In some instances of the aforementioned embodiments, the XORing circuit is a first XORing circuit, the data processing system is implemented as part of a storage system, and the storage system additionally comprises: the storage medium; a read/write head assembly disposed near the storage medium and operable to sense information maintained on the storage medium, and to convert the information to an analog signal; a read channel circuit operable to process a data input derived from the analog signal. The read channel circuit includes a data decoding circuit operable to apply a data decoding algorithm that reverses the data encoding algorithm to yield a decoded output; and a second XORing circuit operable to XOR the decoded output with the selected pattern to reverse the modification incurred by the first XORing circuit.

Figure 2A:
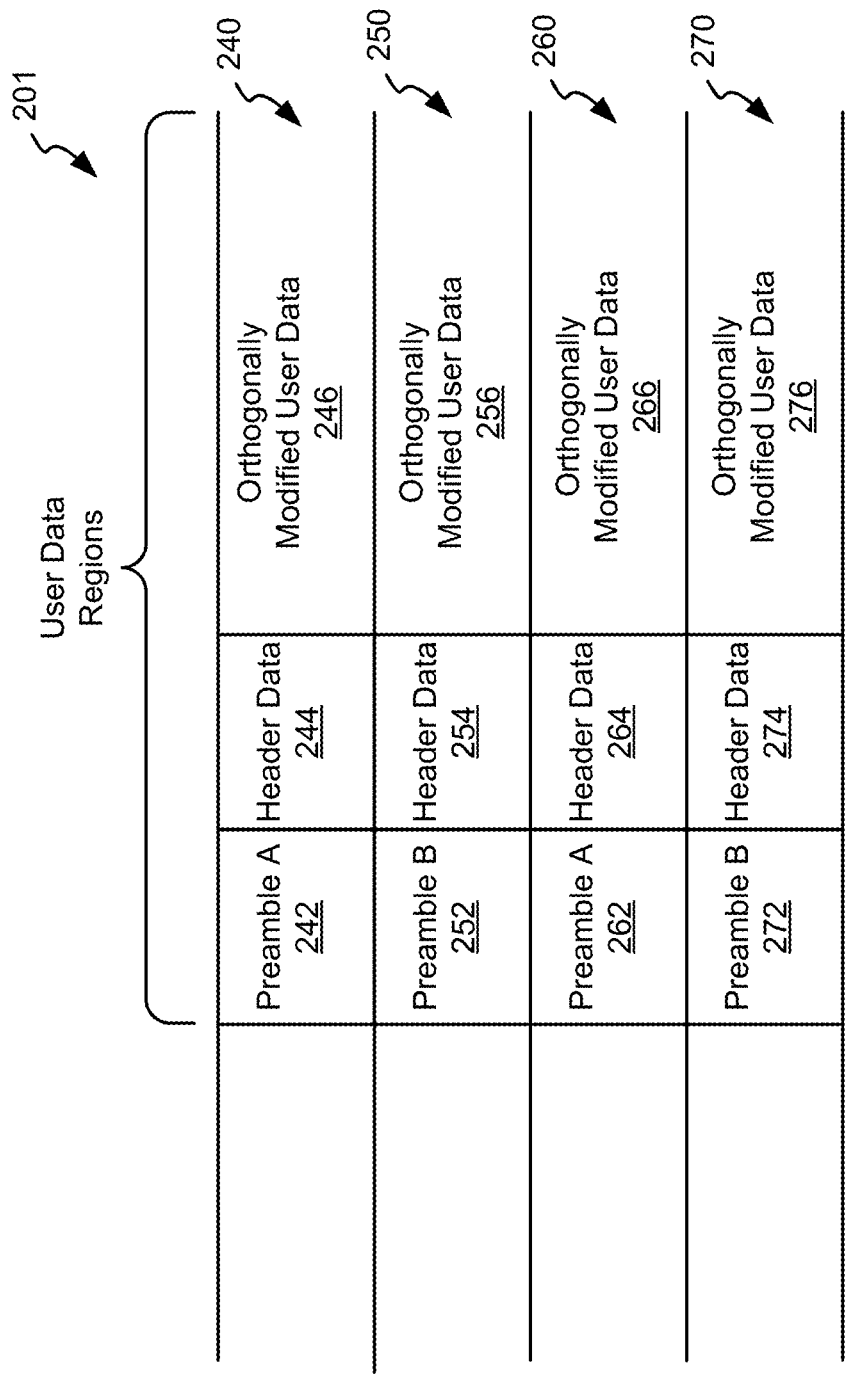
FIGS. 2a-2c are diagrams showing of multiple tracks of a storage medium including orthogonally modified user data in accordance with some embodiments of the present invention.

Embodiments include tracks on a storage medium include user data regions where the user data is orthogonally modified using three different orthogonal patterns allowing processing of data from the user data regions to discern flaws on the storage medium. Turning to FIG. 2a, multiple tracks 240, 250, 260, 276 of a storage medium 201 including orthogonally modified user data 246, 256, 266, 276 on each of the respective tracks. In the embodiments, orthogonally modified user data 246 is modified using a different orthogonal pattern than that used to generate orthogonally modified user data 256; orthogonally modified user data 256 is modified using a different orthogonal pattern than that used to generate orthogonally modified user data 266; and orthogonally modified user data 266 is modified using a different orthogonal pattern than that used to generate orthogonally modified user data 276. In one particular embodiment, three orthogonal patterns are used. In such a case, a combination of a first orthogonal pattern and a second orthogonal pattern are used to generate orthogonally modified user data 246, a combination of a second orthogonal pattern and a third orthogonal pattern are used to generate orthogonally modified user data 256, a combination of a third orthogonal pattern and the first orthogonal pattern are used to generate orthogonally modified user data 266, and a combination of the first orthogonal pattern and the second orthogonal pattern are is used to generate orthogonally modified user data 276. In some cases, the three orthogonal patterns are sinusoidal patterns with a defined period. For example, the first orthogonal pattern may be a 2T pattern (i.e., '0011001100 . . . '), the second orthogonal pattern may be a 3T pattern (i.e., '000111000111 . . . '), and the third orthogonal pattern may be a 4T pattern (i.e., '0000111100001111 . . . '). Generating each of the orthogonally modified user data sets 246, 256, 266, 276 involve XORing a received user data set (e.g., data received from a host to be stored to a storage medium) or a flaw scan test pattern (e.g., all zeros) such that any orthogonally modified user data on an adjacent track is modified using a different orthogonal pattern. Based upon the disclosure provided herein, one of ordinary skill in the art will recognize various combinations of patterns that may be used for the first orthogonal pattern, the second orthogonal pattern, and the third orthogonal pattern.

In addition, each orthogonally modified user data 246, 256, 266, 276 is preceded by a preamble pattern and header data that is included within each of the respective user data regions. The preamble pattern is a repetitive pattern (e.g., a sinusoidal pattern) that can be used to adjust a sampling clock. The header data includes information used to identify and synchronize with data received from a user data region of the track. In particular, orthogonally modified user data 246 is preceded by a preamble A 242 and header data 244; orthogonally modified user data 256 is preceded by a preamble B 252 and header data 254; orthogonally modified user data 266 is preceded by a preamble A 262 and header data 264; and orthogonally modified user data 276 is preceded by a preamble B 272 and header data 274. Preamble A is orthogonal to preamble B allowing for easy separation of intertrack interference. Preamble A is specifically designed to operate both for synchronization purposes, and also to be unmistakable from preamble B that also serves synchronization purposes. In one particular embodiment of the present inventions, preamble A is a 2T preamble (i.e., a pattern that repeats every two periods such as, for example, '00110011'), and preamble B is a non-2T pattern. Such non-2T patterns may include, but are not limited to, a 3T preamble (i.e., a pattern that repeats every three periods such as, for example, '000111000111') or a 2.5T preamble (i.e., a pattern that repeats every two and one half periods such as, for example, '0011100111'). Based upon the disclosure provided herein, one of ordinary skill in the art will recognize various combinations of patterns that may be used for preamble A and preamble B in accordance with different embodiments of the present invention.

It should be noted that while orthogonally modified user data 246, 256, 266, 276 is shown as aligned, in some embodiments adjacent tracks do not necessarily start at the same physical location on the disk. In some cases the adjacent tracks are slightly offset by what is referred to herein as "track skew".

Figures 2B, 2C:
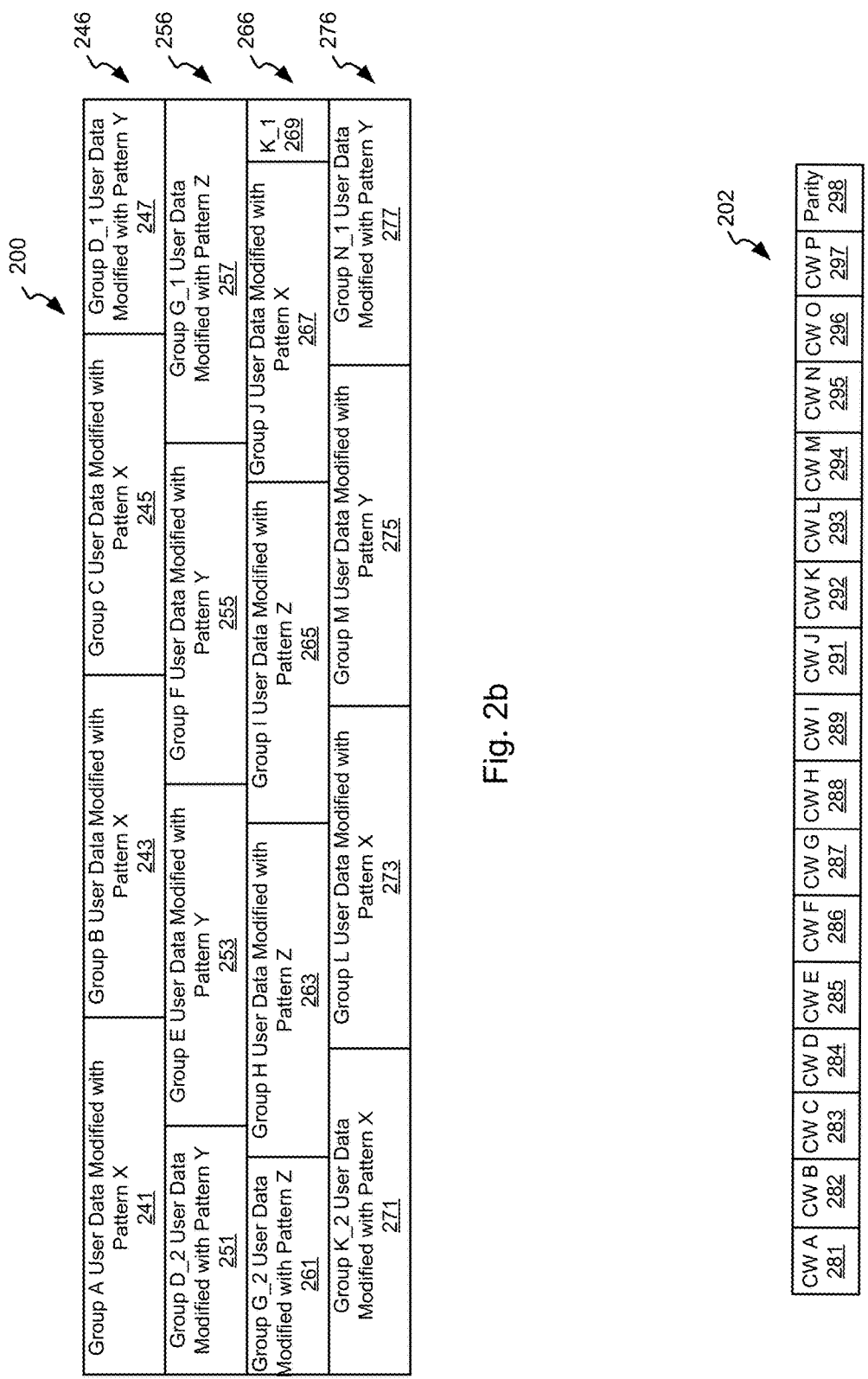

Turning to FIG. 2b, a portion 200 of orthogonally modified user data 246, 256, 266, 276 are shown in greater detail. Orthogonally modified user data 246 is stored to track 240 and includes three full groups of data (i.e., Group A 241, Group B 243, Group C 245) and a portion of a fourth group of data (i.e., Group D_1 247). The entirety of the fourth group of data cannot be written to track 240, and thus the remainder of the fourth group of data (i.e., Group D_2 251) is written to the next track (i.e., track 250) as part of orthogonally modified user data 256. Orthogonally modified user data 256 additionally includes two full groups of data (i.e., Group E 253, Group F 255) and a portion of a seventh group of data (i.e., Group G_1 257). The entirety of the seventh group of data cannot be written to track 250, and thus the remainder of the fourth group of data (i.e., Group G_2 261) is written to the next track (i.e., track 260) as part of orthogonally modified user data 266. Orthogonally modified user data 266 additionally includes three full groups of data (i.e., Group H 263, Group I 265, Group L 267) and a portion of an eleventh group of data (i.e., Group K_1 269). The entirety of the eleventh group of data cannot be written to track 260, and thus the remainder of the eleventh group of data (i.e., Group K_2 271) is written to the next track (i.e., track 270) as part of orthogonally modified user data 276. Orthogonally modified user data 276 additionally includes two full groups of data (i.e., Group L 273, Group M 275) and a portion of a fourteenth group of data (i.e., Group N_1 277). The entirety of the fourteenth group of data cannot be written to track 270, and thus the remainder of the fourteenth group of data (not shown) is written to the next track (not shown).

While not shown, each group of data in portion 200 may be separated by preamble and header data similar to that discussed above in relation to FIG. 2a allowing for resynchronization between each groups of data. In other cases, preamble and header data is only included at the beginning of each of orthogonally modified user data 246, 256, 266, 276. Based upon the disclosure provided herein, one of ordinary skill in the art will recognize a variety of synchronization information that may be placed at one or more locations intermixed within each of orthogonally modified user data 246, 256, 266, 276.

As shown, the first three groups of orthogonally modified user data 246 (i.e., Group A 241, Group B 243, Group C 245) are orthogonally modified using a pattern X. Again, this orthogonal modification is done by XORing the user data or flaw scan data with pattern X. Because the entirety of the fourth group of data (i.e., Group D_1 247) cannot be written to the same track and will include writing the remainder (i.e., Group D_2 251) to the next track, the fourth group is orthogonally modified using a pattern Y. By using pattern Y, the remainder portion of the fourth group (i.e., Group D_2 251) which is adjacent to the first group (i.e., Group A 241) is orthogonally modified using a different pattern than that used for the first group. By doing this, the effects of inter-track interference between track 240 and 250 is limited assuring that the flaw scan can correctly discern errors on the storage medium that includes tracks 240, 250, 260, 270.

The same pattern Y that is used for the remainder (i.e., Group D_2 251) is used for the next two full groups (i.e., Group E 253, Group F 255) as they are adjacent to groups modified with pattern X, and thus the same inter-track interference mitigation is achieved. However, the next group of data (i.e., the combination of Group G_1 257 and Group G_2 261) will overlap both data orthogonally modified with pattern X (i.e., Group C 245) and data orthogonally modified with pattern Y (i.e., Group D_1 247 and Group D_2 251), thus the next group of data (i.e., the combination of Group G_1 257 and Group G_2 261) are orthogonally modified using a pattern Z. By doing this, the effects of inter-track interference between track 240, 250 and 260 is limited assuring that the flaw scan can correctly discern errors on the storage medium that includes tracks 240, 250, 260, 270.

The same pattern Z that is used for the remainder (i.e., Group G_2 261) is used for the next two full groups (i.e., Group H 263, Group I 265) as they are adjacent to groups modified with pattern Y, and thus the same inter-track interference mitigation is achieved. However, the next group of data (i.e., Group J 267) will overlap both data orthogonally modified with pattern Y (i.e., Group F 255) and data orthogonally modified with pattern Z (i.e., Group G_1 257), thus the next group of data (i.e., the combination of Group J 267) are orthogonally modified using the pattern X. By doing this, the effects of inter-track interference between track 250, 260 and 270 is limited assuring that the flaw scan can correctly discern errors on the storage medium that includes tracks 240, 250, 260, 270.

The same pattern X is used for the next two groups (i.e., the combination of Group K_1 269 and Group K_2 271, and Group L 273) as they are adjacent to groups modified with pattern Z, and thus the same inter-track interference mitigation is achieved. However, the next group of data (i.e., Group M 275) will overlap both data orthogonally modified with pattern Z (i.e., Group I 265) and data orthogonally modified with pattern X (i.e., Group J 267), thus the next group of data (i.e., the combination of Group M 275) are orthogonally modified using the pattern Y. By doing this, the effects of inter-track interference between track 260 and 270 is limited assuring that the flaw scan can correctly discern errors on the storage medium that includes tracks 240, 250, 260, 270. This same pattern is used for the portion of the next group (i.e., Group N_1 277) included at the end of orthogonally modified user data 276.

Turning to FIG. 2c, a group 202 is shown that represents one possible assemblage of codewords to form a group of user data (e.g., Group A 241) discussed above in relation to FIG. 2b. As shown, each group of user data includes sixteen codewords (i.e., CW A 281, CW B 282, CW C 283, CW D 284, CW E 285, CW F 286, CW G 287, CW H 288, CW I 289, CW J 291, CW K 292, CW L 293, CW M 294, CW N 295, CW O 296, CW P 297) and parity 298 that is calculated across all of the sixteen codewords. In some cases, the codewords are low density parity check encoded codewords. It should be noted that more or fewer than the sixteen codewords can be used in relation to different embodiments. All of the codewords and parity 298 include data orthogonally modified by the same selected pattern (e.g., pattern X, pattern Y, or pattern Z). Also, while not shown, it should be noted that portions of the codewords and/or sections of group 202 are shuffled (i.e., interleaved) to limit the impact of localized flaws or noise on a given codeword.

Figure 3:
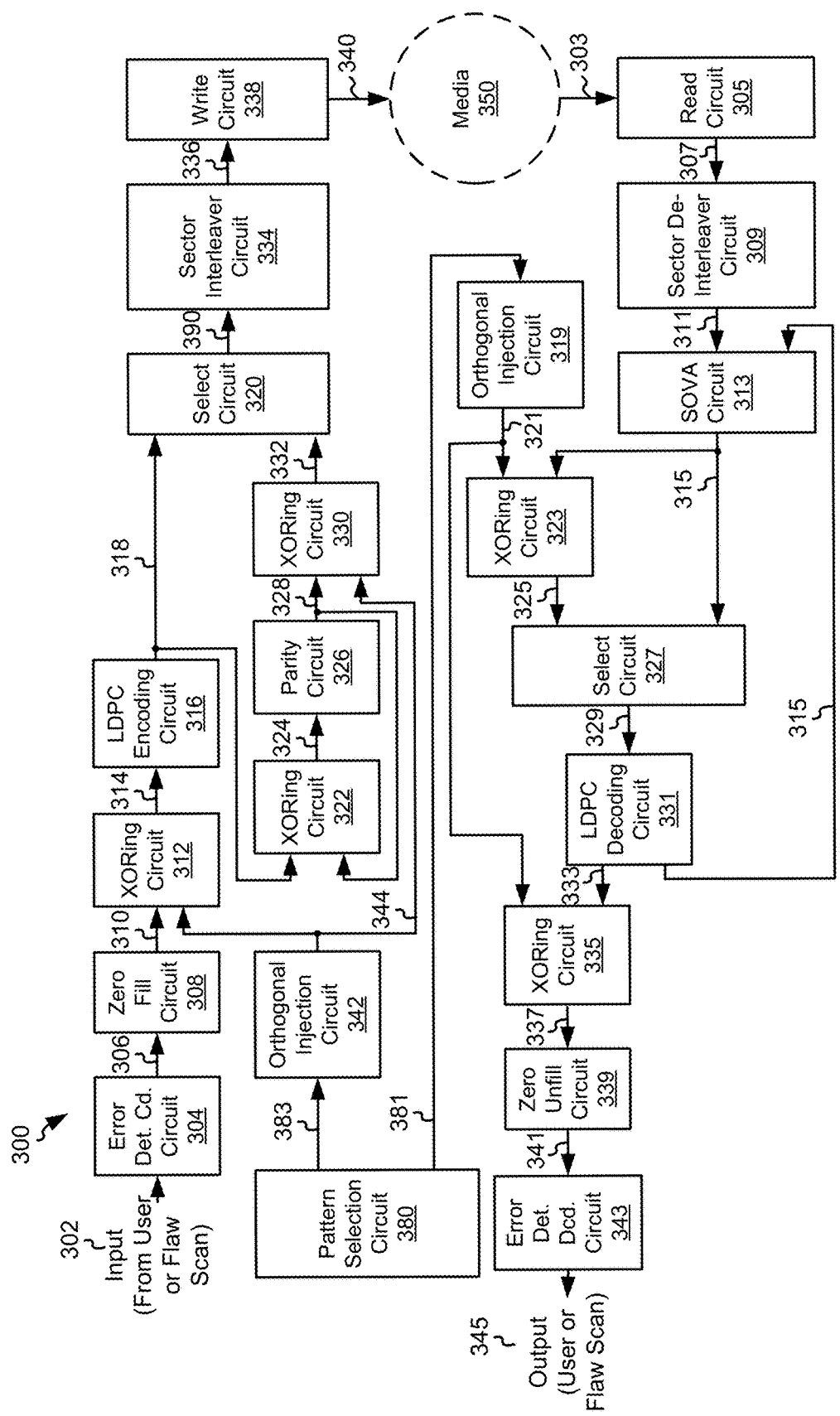
FIG. 3 is a processing circuit in accordance with one or more embodiments of the present inventions that is able to write the orthogonally modified user data shown in FIG. 2b above.

Turning to FIG. 3, a processing circuit 300 is shown in accordance with one or more embodiments of the present inventions that is able to write the orthogonally modified user data shown in FIG. 2b above. Processing circuit 300 includes a data input 302 that receives data from either a user data source or a flaw scan source. The aforementioned user data source may be, for example, a host device (not shown) that is supplying data to be written to a storage medium. The aforementioned flaw scan data may be, for example, a series of zeros that when orthogonally modified by a pattern yields a periodic write data set useful in discerning defective areas on the storage medium. Based upon the disclosure provided herein, one of ordinary skill in the art will recognize various sources of data for data input 302.

Data input 302 is connected to an error detection code encoder circuit 304 that applies an algorithm to the data received via data input 302 to yield an EDC output 306. Error detection code encoder circuit 304 may be any circuit known in the art that is capable of generating encoding data useful for correcting errors. Based upon the disclosure provided herein, one of ordinary skill in the art will recognize a variety of error detection code encoder circuit 304 that may be used in relation to different embodiments of the present invention.

EDC output 306 is provided to a zero fill circuit 308 that pads EDC output 306 with a number of zeros to yield a zero filled output 310 that is a consistent length. Zero filled output 310 is provided to an XORing circuit 312 where each bit of zero filled output 310 is XORed with a corresponding bit from a selected orthogonal pattern 344 to yield an orthogonally modified output 314. As more fully discussed below, selected orthogonal pattern 344 is selected based upon knowledge of where on a media 350 the data will ultimately be written to achieve the non-overlapping orthogonal modification discussed above in relation to FIG. 2b.

Orthogonally modified output 314 is provided to a low density parity check (LDPC) encoding circuit 316 where an LDPC encoding algorithm is applied to yield an LDPC codeword 318. LDPC codeword 318 is provided to an XORing circuit 322 where it is XORed with a current block parity output 328 to yield an interim output 324. Interim output 324 is provided to a parity calculation circuit 326 that updates current block parity 328. The aforementioned processes of LDPC encoding and block parity calculation is continued until a defined number of codewords 318 are generated and current block parity 328 corresponds to the aggregate of all of the codewords 318. Once current block parity 328 corresponds to all of the defined number of codewords 318, each bit of current block parity is provided to an XORing circuit 330 where they are XORed with corresponding bits of selected orthogonal pattern 344 to yield an orthogonally modified parity 332. In one particular embodiment, the defined number of codewords 318 is sixteen. Based upon the disclosure provided herein, one of ordinary skill in the art will recognize other numbers of codewords that may be used in relation to different embodiments.

A select circuit 320 is set to allow the defined number of codewords 318 through with the codewords being appended one to another such as shown in FIG. 2c, and then allowing orthogonally modified parity 332 which is appended to the end of the combined codewords as shown in FIG. 2c. The combination of codewords 318 and orthogonally modified parity 332 are provided as a group of data 390.

Group of data 390 is provided to a sector interleaver circuit 334. Interleaver circuit 334 shuffles elements within group of data 390 to limit the impact of localized flaws or noise on a given codeword or parity data set. The resulting shuffled data is provided as an interleaved output 336 to a write circuit 338. Instances of interleaved output 336 correspond to the groups of data (e.g., Group A 241) discussed above in relation to FIG. 2b. Write circuit 338 prepares interleaved output 336 for writing as a continuous analog signal 340 to media 350. Any circuit capable of formatting data to be written to a storage medium may be used for write circuit 338.

A pattern selection circuit 380 selects which pattern is used to modify both current block parity 328 and zero filled output 310. In particular, a pattern is selected in accordance with the following pseudocode:

define T: pattern transition location
define P: selected orthogonal pattern {Pattern X, Pattern Y, Pattern Z}
initialize T=end of first track; /* for the first track written there is no overlap with prior track */
initialize P=Pattern X; /* select the first orthogonal pattern */
foreach (Group of Data){
  If (Group of Data when written extends beyond T){
    select next P; /* e.g., if P is Pattern X, then select Pattern Y */
    set T equal to location of transition between Groups of Data where next P starts
  }
}

Thus, following the aforementioned pseudocode in relation to the example of FIG. 2b, when Group A 241 is to be written the first orthogonal pattern (Pattern X) is selected and used to modify the data to be written because Group A 241 does not extend beyond the end of track 240 (i.e., the initialized location of T). When Group B 243 is to be written the first orthogonal pattern (Pattern X) is selected and used to modify the data to be written because Group B 243 does not extend beyond the end of track 240 (i.e., the initialized location of T). Similarly, when Group C 245 is to be written the first orthogonal pattern (Pattern X) is selected and used to modify the data to be written because Group C 245 does not extend beyond the end of track 240 (i.e., the initialized location of T). In contrast, Group D (i.e., the combination of Group D_1 247 and Group D_2 251) when written will extend beyond T, and as such the next pattern (Pattern Y) is selected and used to modify the data to be written. In addition, the location of T is changed to the location at which the transition between Group C 245 and Group D (i.e., the combination of Group D_1 247 and Group D_2 251) occurs. The next two Groups (i.e., Group E 253 and Group F 255) are modified using the same pattern (Pattern Y) as when written they do not extend beyond the updated T (i.e., the location at which the transition between Group C and Group D occurs). In contrast, the succeeding Group G (i.e., the combination of Group G_1 257 and Group G_2 261) when written will extend beyond the updated T, and thus the next pattern (Pattern Z) is selected and used to modify the data to be written. In addition, the location of T is changed to the location at which the transition between Group F 255 and Group G (i.e., the combination of Group G_1 257 and Group G_2 261) occurs. This process continues until all tracks are read in preparation for a flawscan test, and results in no overlap of data on adjacent tracks modified by the same orthogonal pattern. Further, the process results in the writing of valid LDPC codewords such that when the storage medium is deployed in the field every track will be filled with valid codewords without requiring an additional write beyond the preparation for the flawscan. Notably, this process may be applied to both user data and flaw scan data. It should be noted that while the preceding pseudocode uses three different orthogonal patterns, other embodiments may use four or more orthogonal patterns. Additionally, it should be noted that where track skew is non-zero, multiple transition points are tested.

Pattern selection circuit 380 provides a selection output 383 to an orthogonal injection circuit 342 which indicates one of the three patterns (e.g., pattern X, pattern Y, or pattern Z discussed above in relation to FIG. 2b) has been selected. In turn, orthogonal injection circuit 342 generates selected orthogonal pattern 344 consistent with the selected pattern. For example, where a 2T pattern is indicated by selection output 383, orthogonal injection circuit 342 provides '001100110011 . . . ' as selected orthogonal pattern 344. Alternatively, where a 3T pattern is indicated by selection output 383, orthogonal injection circuit 342 provides '000111000111000111 . . . ' as selected orthogonal pattern 344; or where a 4T pattern is indicated by selection output 383, orthogonal injection circuit 342 provides '0000111100001111 00001111 . . . ' as selected orthogonal pattern 344.

Data is read back from media 350 as a readback signal 303 which is provided to a read circuit 305. Read circuit 305 may be any circuit known in the art that is capable of receiving an analog signal derived from media 350 and to provide a corresponding digital output 307. In some cases, read circuit 305 includes an analog front end circuit including amplification and filtering, and an analog to digital conversion circuit operable to sample the processed analog signal to yield a series of digital samples provided as digital output 307. Based upon the disclosure provided herein, one of ordinary skill in the art will recognize a variety of analog processing circuitry that may be used to implement read circuit 305.

Digital output 307 is provided to a sector de-interleaver circuit 309 that reverses the shuffling applied by sector interleaver circuit 334 to yield a de-interleaved output 311. De-interleaved output 311 thus becomes similar to that discussed above in relation to FIG. 3c. De-interleaved output 311 is provided to a soft output Viterbi algorithm (SOVA) data detection circuit 313 to yield a detected output 315. It should be noted that while a SOVA detector is shown, other data detector circuits may be used in relation to different embodiments.

Detected output 315 is provided to an XORing circuit 323 where at least the block parity included in each received group is XORed with a selected orthogonal pattern 321 to yield a block parity output 325. Selected orthogonal pattern 321 is the same pattern that was selected when the original block parity 328 was XORed by XORing circuit 330. By XORing by the same pattern originally used by XORing circuit 330, the original XORing is reversed and the original block parity 328 is recovered.

Orthogonal pattern 321 is generated by an orthogonal injection circuit 319 that generates selected orthogonal pattern 321 consistent with a pattern selection output 381 from pattern selection circuit 380. For example, where a 2T pattern is indicated by selection output 381, orthogonal injection circuit 319 provides '001100110011 . . . ' as selected orthogonal pattern 321. Alternatively, where a 3T pattern is indicated by selection output 381, orthogonal injection circuit 319 provides '000111000111000111 . . . ' as selected orthogonal pattern 321; or where a 4T pattern is indicated by selection output 381, orthogonal injection circuit 319 provides '0000111100001111 00001111 . . . ' as selected orthogonal pattern 321. Pattern selection circuit 380 asserts selection output 381 based upon a table indicating which selected orthogonal pattern 344 was used to modify the corresponding data in preparation for storage to media 350.

A select circuit 327 provides a first portion of detected output 315 corresponding to codewords in the group of data being processed as a first part of an assembled output 329, and selects a second portion of detected output 315 corresponding to block parity in the group of data being processed as a second part of an assembled output 329. At this juncture, the orthogonal modification to block parity 328 has been reversed, but the orthogonal modification to the data used to generate the codewords remains.

Assembled output 329 is provided to a low density parity check (LDPC) decoder circuit 331 that applies an LDPC decoding algorithm to recover an orthogonally modified output 333 (i.e., an output corresponding to orthogonally modified output 314). In some cases, the application of the data detection algorithm by SOVA circuit 313 and application of the LDPC decoding algorithm may be repeatedly applied as is known in the art. Once all errors in assembled output 329 have been resolved, orthogonally modified output 333 is provided to XORing circuit 335 that XORs the received data with selected orthogonal pattern 321 to reverse the orthogonal modification originally applied by XORing circuit 317. This reversal of the orthogonal modification yields a zero filled output 337 that corresponds to zero filled output 310. A zero unfill circuit 339 eliminates all zero padding originally added by zero fill circuit 308 to yield an EDC output 341 corresponding to EDC output 306. EDC decoding processes are applied by an error detection code decoder circuit 343 to yield data provided via a data output 345.

Where standard data processing is being performed, the data provided via data output 345 is provided to a device (not shown) that requested data readback from media 350. Alternatively, where flaw scan processing is being performed, the data provided via data output 345 is substantially all zeros. In such a flawscan situation, the combination of orthogonally modified output 333 and the portion of detected output 315 which exhibit selected orthogonal pattern (e.g., a 2T pattern, a 3T pattern, or a 4T pattern) are provided to a flaw scan analysis tool (not shown) that uses the data to discern whether areas on media 350 are defective.

Figure 4:
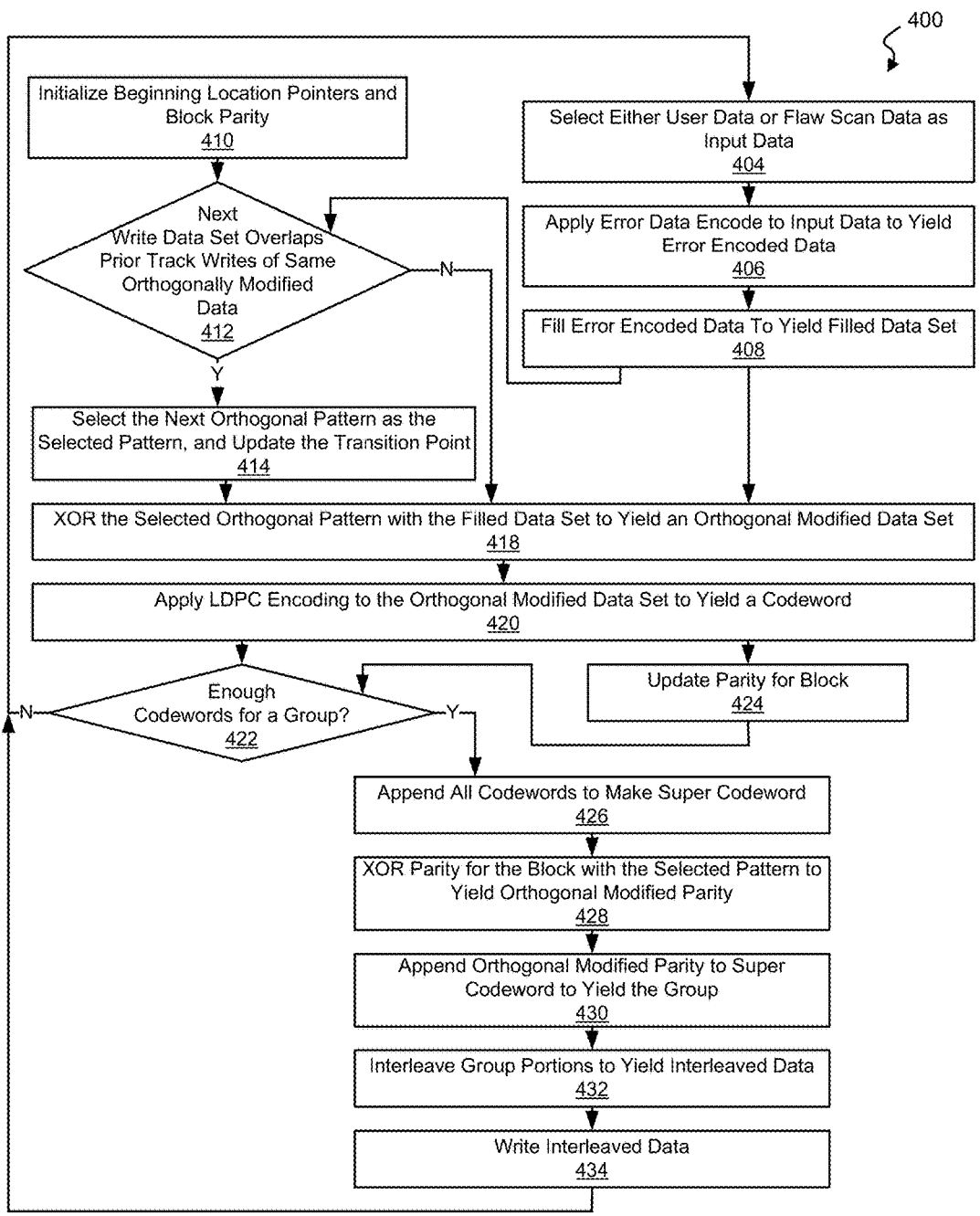
FIG. 4 is a flow diagram showing a method for writing the orthogonally modified user data shown in FIG. 2b above in accordance with some embodiments of the present invention.

Turning to FIG. 4, a flow diagram 400 shows a method for writing the orthogonally modified user data shown in FIG. 2b above in accordance with some embodiments of the present invention. The flow diagram discloses the process for selecting orthogonal patterns consistent with the following pseudocode:

```
define T: pattern transition location
define P: selected orthogonal pattern {Pattern X, Pattern Y, Pattern Z}
initialize T=end of first track; /* for the first track written there is no overlap with prior track */
initialize P=Pattern X; /* select the first orthogonal pattern */
foreach (Group of Data){
    If (Group of Data when written extends beyond T){
        select next P; /* e.g., if P is Pattern X, then select Pattern Y */
        set T equal to location of transition between Groups of Data where next P starts
    }
}
```

Thus, following the aforementioned pseudocode in relation to the example of FIG. 2b, when Group A 241 is to be written the first orthogonal pattern (Pattern X) is selected and used to modify the data to be written because Group A 241 does not extend beyond the end of track 240 (i.e., the initialized location of T). When Group B 243 is to be written the first orthogonal pattern (Pattern X) is selected and used to modify the data to be written because Group B 243 does not extend beyond the end of track 240 (i.e., the initialized location of T). Similarly, when Group C 245 is to be written the first orthogonal pattern (Pattern X) is selected and used to modify the data to be written because Group C 245 does not extend beyond the end of track 240 (i.e., the initialized location of T). In contrast, Group D (i.e., the combination of Group D_1 247 and Group D_2 251) when written will extend beyond T, and as such the next pattern (Pattern Y) is selected and used to modify the data to be written. In addition, the location of T is changed to the location at which the transition between Group C 245 and Group D (i.e., the combination of Group D_1 247 and Group D_2 251) occurs. The next two Groups (i.e., Group E 253 and Group F 255) are modified using the same pattern (Pattern Y) as when written they do not extend beyond the updated T (i.e., the location at which the transition between Group C and Group D occurs). In contrast, the succeeding Group G (i.e., the combination of Group G_1 257 and Group G_2 261) when written will extend beyond the updated T, and thus the next pattern (Pattern Z) is selected and used to modify the data to be written. In addition, the location of T is changed to the location at which the transition between Group F 255 and Group G (i.e., the combination of Group G_1 257 and Group G_2 261) occurs. This process continues until all tracks are read in preparation for a flawscan test, and results in no overlap of data on adjacent tracks modified by the same orthogonal pattern. Further, the process results in the writing of valid LDPC codewords such that when the storage medium is deployed in the field every track will be filled with valid codewords without requiring an additional write beyond the preparation for the flawscan. Notably, this process may be applied to both user data and flaw scan data. Again, it should be noted that while the preceding pseudocode uses three different orthogonal patterns, other embodiments may use four or more orthogonal patterns. Additionally, it should be noted that where track skew is non-zero, multiple transition points are tested.

Following flow diagram 400, beginning location pointers (e.g., P and T from the pseudocode above) are initialized along with setting the block parity to zero (block 410). It is determined whether the next write data set overlaps prior track writes that were modified using the same orthogonal pattern (block 412). For example, referring to the pseudocode above and FIG. 2b, where Group A 241 is to be written it does not extend past T as initialized to the end of the first track and thus it is determined that the next write data set does not overlap prior track writes that were modified using the same orthogonal pattern. As another example, where Group G (i.e., the combination of Group G_1 257 and Group G_2 261) is to be written, it extends past T as updated to be the location at which the transition between Group C and Group D occurs. In such a case, it is determined that the next write data set overlaps prior track writes that were modified using the same orthogonal pattern. Where the next write data set overlaps prior track writes that were modified using the same orthogonal pattern (block 412), the next orthogonal pattern (i.e., P from the pseudocode above) is selected and the location where the transitions between writes of orthogonal patterns is set equal to the transition point (i.e., T from the pseudocode above) (block 414). Otherwise, where the next write data set does not overlap prior track writes that were modified using the same orthogonal pattern (block 412), the transition point and the selected orthogonal pattern remain unchanged.

In parallel, either user data or flawscan data is selected as input data to be written to a storage medium (block 404). Generally, flaw scan data is selected during manufacture to test a medium and remains stored on the medium when the medium is deployed. The flawscan data is compatible with a deployed medium because it is represented as valid codewords. Without this, a time consuming process of re-writing the medium with valid codewords would be required prior to deploying the medium. Once the medium is deployed, user data is selected which is stored to the medium for later read and remains until it is overwritten.

An error data encode is applied to the input data to yield an error encoded data (block 406), and the resulting error encoded data is padded with zeros to make an filled data set of a defined length (block 408). The filled data set is XORed on a bit by bit basis with corresponding bits of the selected orthogonal pattern to yield an orthogonally modified data set (block 418), and LDPC encoding is applied to the orthogonally modified data set to yield a codeword (block 420).

The parity block is updated by applying a parity generation algorithm to the received codeword (block 424). It is then determined if enough codewords have been generated to complete a group (block 422). In some embodiments, a group consists of sixteen codewords. Based upon the disclosure provided herein, one of ordinary skill in the art will recognize other numbers of codewords that may be included to form a group. Where insufficient codewords have been generated to create a group (block 422), the processes of the preceding blocks are repeated. Alternatively, where sufficient codewords have been generated to create a group (block 422), all of the codewords for the group are appended to make a super codeword (block 426), and the current block parity (i.e., parity from block 424) is XORed with the selected orthogonal pattern to yield an orthogonally modified parity (block 428). The orthogonally modified parity is appended to the super codeword to yield the group (block 430). At this juncture, the group looks similar to that discussed above in relation to FIG. 2c.

The group is segmented into discrete portions, and the discrete portions are shuffled (i.e., interleaved) to limit the impact of localized flaws or noise on a given codeword or parity data set (block 432). The resulting shuffled data is provided as an interleaved output which is written to the storage medium. This process continues for each set of data to be written.

Figure 5:
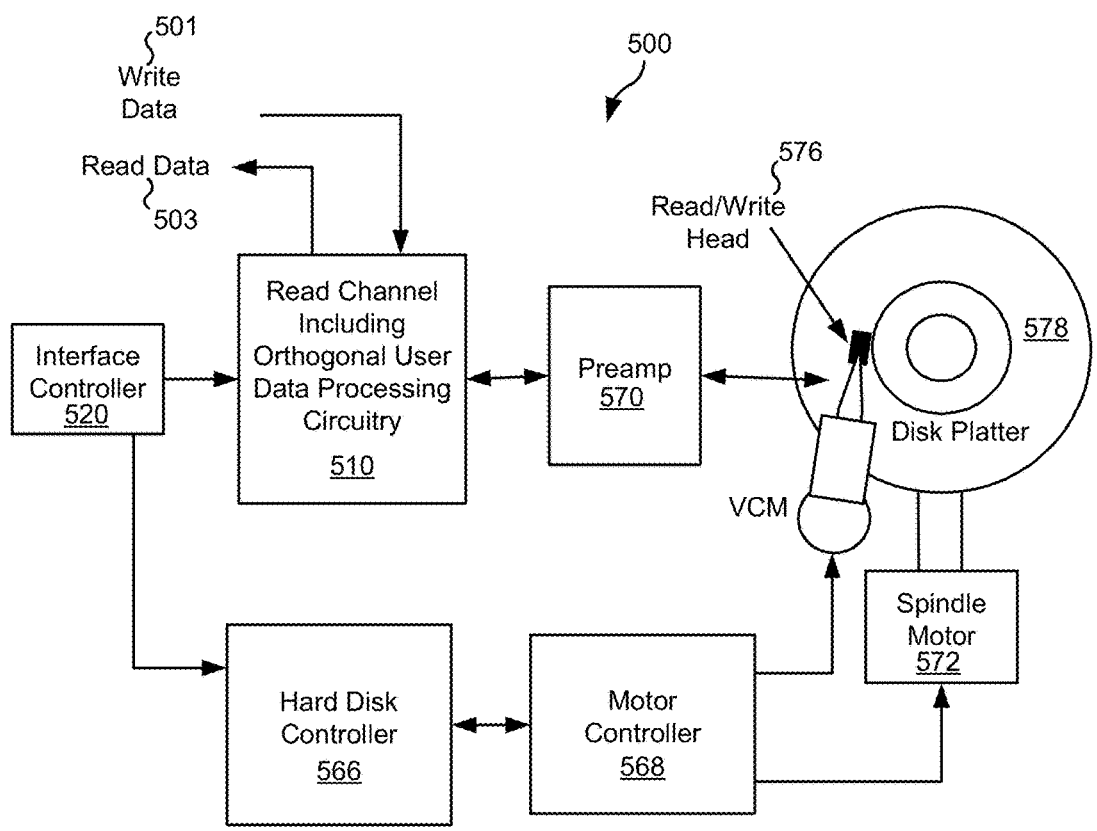
FIG. 5 shows a storage system that includes a read channel having orthogonal user data processing circuitry in accordance with one or more embodiments of the present invention.

Turning to FIG. 5, a storage system 500 is shown that includes a read channel 510 having orthogonal user data processing circuitry in accordance with one or more embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head 576. Read/write head 576 includes one or more individual read heads each sensing data on a given track of disk platter 578. Interface controller 520 controls addressing and timing of data to/from disk platter 578, and interacts with a host controller (not shown). The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head 576 is accurately positioned by motor controller 568 over a desired data track on disk platter 578. Motor controller 568 both positions read/write head 576 in relation to disk platter 578 and drives spindle motor 572 by moving read/write head assembly 576 to the proper data track on disk platter 578 under the direction of hard disk controller 566. Spindle motor 572 spins disk platter 578 at a determined spin rate (RPMs). Once read/write head 576 is positioned adjacent the proper data track, magnetic signals representing data on disk platter 578 are sensed by read/write head 576 as disk platter 578 is rotated by spindle motor 572. The sensed magnetic signals are provided as a continuous, minute analog signal representative of the magnetic data on disk platter 578. This minute analog signal is transferred from read/write head 576 to read channel circuit 510 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. A write operation is substantially the opposite of the preceding read operation with write data 501 being provided to read channel circuit 510. This data is then encoded and written to disk platter 578.

The data stream(s) developed from each of the read heads of read/write head 576 is/are processed to recover user data or flaw scan data originally used to generate orthogonally modified user data. Where flaw scan data is recovered, the orthogonally modified flaw scan data is compared with an expected pattern to discern areas on disk platter 578 that are defective. A data processing circuit similar to that discussed above in relation to FIG. 3 may be included in read channel 510. Further, the processing may be performed similar to that discussed above in relation to FIG. 4.

It should be noted that storage system 500 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 500, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 510 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 500 may be modified to include solid state memory that is used to store data in addition to the storage offered by disk platter 578. This solid state memory may be used in parallel to disk platter 578 to provide additional storage. In such a case, the solid state memory receives and provides information directly to read channel circuit 510. Alternatively, the solid state memory may be used as a cache where it offers faster access time than that offered by disk platted 578. In such a case, the solid state memory may be disposed between interface controller 520 and read channel circuit 510 where it operates as a pass through to disk platter 578 when requested data is not available in the solid state memory or when the solid state memory does not have sufficient storage to hold a newly written data set. Based upon the disclosure provided herein, one of ordinary skill in the art will recognize a variety of storage systems including both disk platter 578 and a solid state memory.

Additionally, it should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would not be a circuit. In other cases, the one part of a given system, block or circuit may be implemented in software or firmware, while other parts are implemented in hardware.

In conclusion, the inventions provides novel systems, devices, methods and arrangements for data processing. While detailed descriptions of one or more embodiments of the inventions have been given above, various alternatives, modifications, and equivalents will be apparent to those skilled in the art without varying from the spirit of the invention. Therefore, the above description should not be taken as limiting the scope of the inventions, which is defined by the appended claims.

What is claimed is:

1. A non-transitory storage medium maintaining information readable by an electronic data processing circuit, the non-transitory storage medium comprising:
    a first track including a first servo wedge, a second servo wedge, and a first user data region disposed between the first wedge and the second wedge, wherein the first user data region includes at least a first preamble pattern, a first group of data modified by a first pattern, and a second group of data modified by a second pattern;
    a second track adjacent to the first track, wherein the second track includes the first servo wedge, the second servo wedge, and a second user data region disposed between the first wedge and the second wedge, wherein the second user data region includes at least a second preamble pattern, a third group of data modified by the second pattern, and a fourth group of data modified by a third pattern such that the third group of data is not adjacent to the second group of data.

2. The non-transitory storage medium of claim 1, wherein the first group of data, the second group of data, the third group of data, and the fourth group of data are flawscan data.

3. The non-transitory storage medium of claim 1, wherein the first pattern is orthogonal to both the second pattern and the third pattern.

4. The non-transitory storage medium of claim 1, wherein the first pattern is a 2T pattern, the second pattern is a 3T pattern, and the third pattern is a 4T pattern.

5. The non-transitory storage medium of claim 4, wherein the first preamble is orthogonal to the second preamble.

6. The non-transitory storage medium of claim 4, wherein the first preamble is a 2T preamble pattern and the second preamble is a 3T preamble pattern.

7. The non-transitory storage medium of claim 1, wherein the non-transitory medium is a magnetic storage medium, and wherein the information is maintained as a magnetic pattern.

8. The non-transitory storage medium of claim 1, wherein the non-transitory storage medium is incorporated into a hard disk drive system, and wherein the hard disk drive system includes:
    a read/write head assembly disposed near the storage medium and operable to sense the information and to convert the information to an analog signal; and
    a read channel circuit operable to process a data input derived from the analog signal, and including a circuit to reverse:
        the modification of the first group of data by the first pattern;
        the modification of the second group of data by the second pattern;
        the modification of the third group of data by the second pattern; and
        the modification of the fourth group of data by the third pattern.

9. A method for data processing, the method comprising:
    providing a storage medium including at least a first track and a second track, wherein the first track is next to the second track;
    XORing a received data set by a selected pattern to yield a modified data set;
    using a data encoding circuit to encode the modified data set to yield a generated codeword;
    storing the generated codeword as part of a write data set to a storage medium; and
    selecting one of a first pattern, a second pattern, or a third pattern as the selected pattern such that a first codeword on the first track of a storage medium adjacent to a second codeword on the second track of the storage medium does not represent a data set modified by the same selected pattern as a data set represented by the second codeword.

10. The method of claim 9, wherein the received data set is flawscan data.

11. The method of claim 9, wherein the first pattern is orthogonal to both the second pattern and the third pattern.

12. The method of claim 9, wherein the first pattern is a 2T pattern, the second pattern is a 3T pattern, and the third pattern is a 4T pattern.

13. The method of claim 9, wherein the data encoding circuit is a low density parity check encoding circuit.

14. A data processing system, the system comprising:
    an XORing circuit operable to XOR a received data set by a selected pattern to yield a modified data set;
    a data encoding circuit operable to encode the modified data set to yield a generated codeword;
    an interleaver circuit operable to interleave a group of data including the generated codeword and other data modified using the selected pattern to yield a first interleaved output;
    a data write circuit operable to write the interleaved output to a storage medium, wherein the storage medium includes at least a first track adjacent to a second track; and
    a pattern selection circuit operable to select one of a first pattern, a second pattern, or a third pattern as the selected pattern such that the first interleaved output is stored on the first track adjacent to a second interleaved output stored on the second track, wherein the second interleaved output includes data modified by a pattern other than the selected pattern.

15. The data processing system of claim 14, wherein the received data set is flawscan data.

16. The data processing system of claim 14, wherein the first pattern is orthogonal to both the second pattern and the third pattern.

17. The data processing system of claim 14, wherein the first pattern is a 2T pattern, the second pattern is a 3T pattern, and the third pattern is a 4T pattern.

18. The data processing system of claim 14, wherein the XORing circuit is a first XORing circuit, wherein the data processing system is implemented as part of a storage system, and wherein the storage system additionally comprises:
    the storage medium;
    a read/write head assembly disposed near the storage medium and operable to sense information maintained on the storage medium, and to convert the information to an analog signal; and
    a read channel circuit operable to process a data input derived from the analog signal, and including:

a data decoding circuit operable to apply a data decoding algorithm that reverses the data encoding algorithm to yield a decoded output; and a second XORing circuit operable to XOR the decoded output with the selected pattern to reverse the modification incurred by the first XORing circuit.

19. The data processing system of claim 14, wherein the system is implemented as part of an integrated circuit.

20. The data processing system of claim 14, wherein the data encoding circuit is a low density parity check encoding circuit.

\* \* \* \* \*